Aug. 2, 1960   H. W. CHAPMAN ET AL   2,947,262
PORTABLE TROLLEY TRACK AND TROLLEY ASSEMBLY
Filed Nov. 3, 1954   2 Sheets-Sheet 2
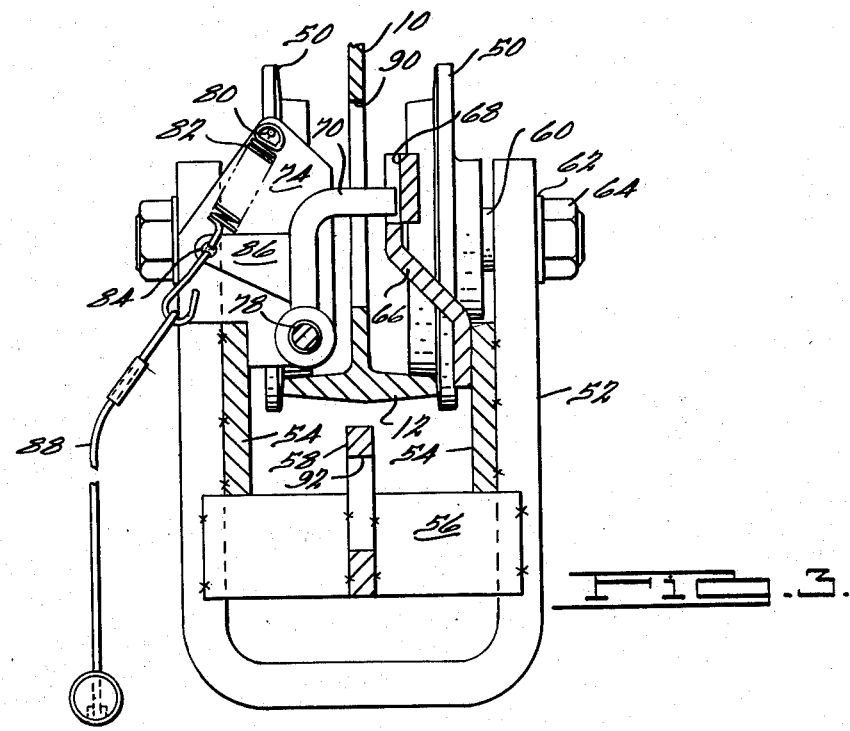
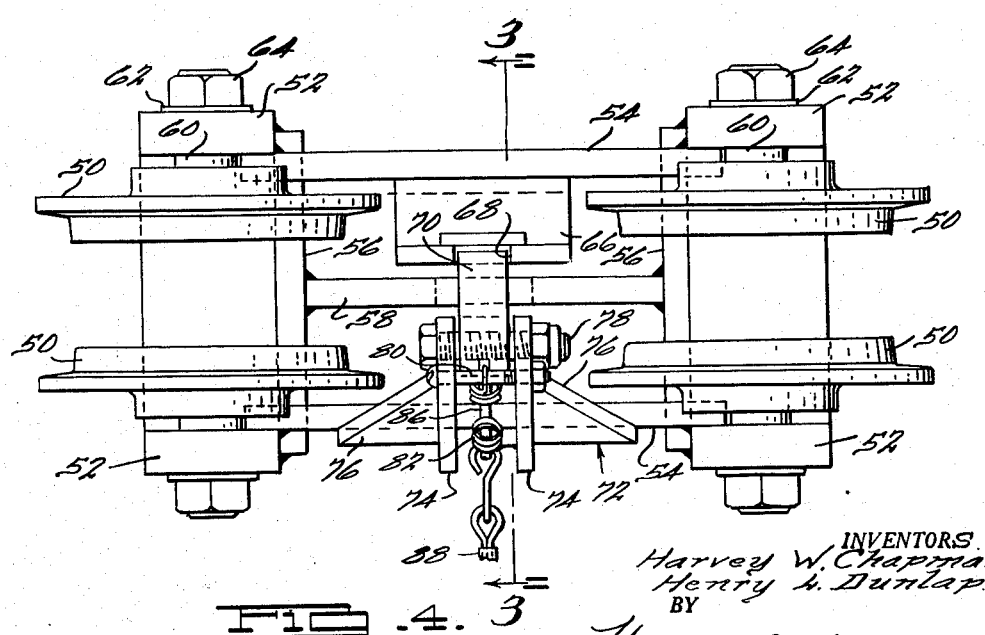
INVENTORS
Harvey W. Chapman
Henry L. Dunlap
BY
Harness, Dickey & Pierce
ATTORNEYS

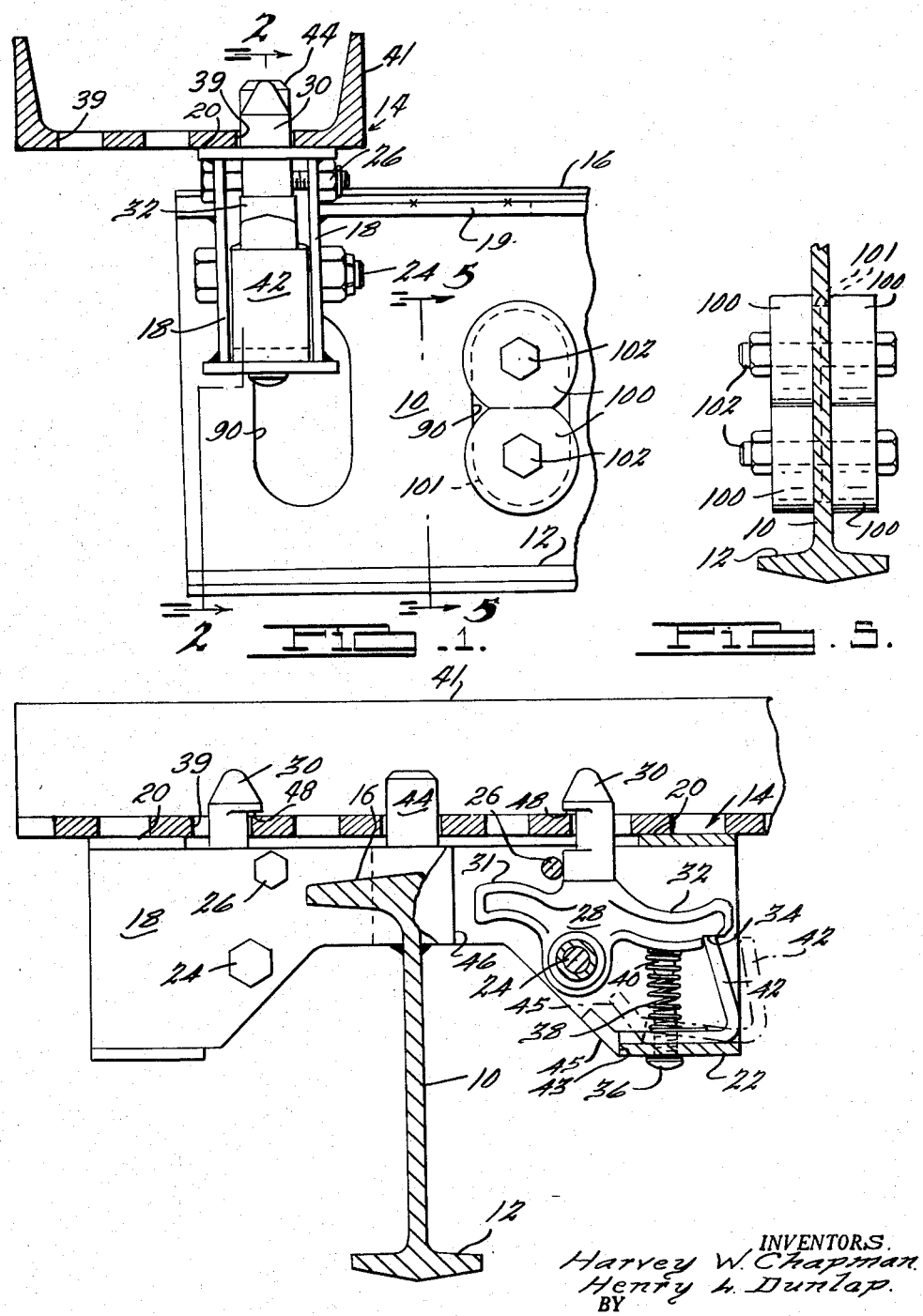

United States Patent Office 2,947,262
Patented Aug. 2, 1960

2,947,262

PORTABLE TROLLEY TRACK AND TROLLEY ASSEMBLY

Harvey W. Chapman, Detroit, and Henry L. Dunlap, Dearborn, Mich., assignors to Evans Products Company, Plymouth, Mich., a corporation of Delaware Filed Nov. 3, 1954, Ser. No. 466,612

8 Claims. (Cl. 104—111)

The present invention relates generally to freight loading and storing apparatus for use in freight storage areas or in freight and cargo-hauling vehicles such as ships, railroad cars, highway trucks and the like. More specifically, the invention relates to a portable trolley track and trolley assembly for use with freight-loading apparatus of the type employing a pattern of members affixed to opposed surfaces enclosing a freight storage area which members have a series of holes in their exposed surfaces.

In our copending application S.N. 457,474 filed September 18, 1954, now U.S. Patent No. 2,834,304, a system of freight-loading apparatus is disclosed which employs opposed, aligned patterns of fixed structural members on two surfaces enclosing a freight-supporting surface, usually one pattern on the freight-supporting surface itself and another supported on the overhead above the latter, which fixed structural members each have on their exposed surfaces a pattern of holes and/or lines of holes in which re-usable bracing members and dunnage members may be anchored by means of pins.

The principal object of this invention is to provide a portable trolley track and trolley assembly for use in connection with the freight-loading system described above, which track can be moved about the ship, railroad car, truck, etc. and affixed to the holes in the fixed structural members at any point above the freight or cargo to be lifted.

Another object is to provide a trolley incorporating a positive dead man's stop so as to safeguard the handling of delicate or dangerous cargo.

Still another object of this invention is to provide a portable trolley track and trolley assembly which is light, easy to attach and detach and which will facilitate both loading and unloading of freight or cargo by being positioned directly over the freight to be lifted.

Other objects and advantages of the present invention will be apparent, or will become apparent, in the description to follow, especially when taken in conjunction with the accompanying drawings, in which:

Figure 1 is a side view of the trolley track member showing in particular one of the mounting fittings and the dead man stop holes in the beam-like member;

Fig. 2 is an end view in section showing in particular the details of one of the lock pin and latch assemblies on one end of one of the mounting fittings, the left-hand end of the fitting being shown in elevation, and showing the details of the T-shaped beam-like trolley track member itself, the section being taken substantially along the line 2—2 of Fig. 1;

Fig. 3 is a transverse sectional view through the trolley assembly showing in particular the details of the dead man stop latch means; the section being taken along the line 3—3 of Fig. 4;

Fig. 4 is a plan view of the trolley assembly; and

Fig. 5 is a sectional view taken on line 5—5 of Fig. 1 of the trolley track showing in particular the clamp-on type end stop installed thereon.

In accordance with the present invention, there has been provided a portable trolley track and trolley assembly comprising a T-shaped trolley support or track member having a plurality of transverse fittings having pins for insertion in the holes of a fixed pattern of structural members supported above a freight-supporting surface, which pins are arranged to lock the trolley track member thereto. The trolley track member is made of metal and is of such simplified construction that it is sufficiently light to be lifted and fastened into place by one or two men. The track member can be made of lightweight steel or of aluminum or magnesium alloys, if desired. Since the track can be supported at a plurality of points by an appropriate number of transverse pin-fittings, the beam portion of the track member need not be of heavy guage stock even when quite heavy loads are to be lifted. A series of dead man stop holes can be provided along the length of the track to cooperate with a trolley assembly having a dead man stop latch mechanism incorporated in the trolley assembly, the holes further serving to lighten the weight of the track beam. An exemplary trolley assembly carries a spring-operated dead man latch lever operated by a pull cord or chain such that whenever the cord or chain is released, the lever enters one of the dead man stop holes of the track beam to stop the trolley assembly. This is an especially valuable safety feature when handling dangerous cargo, such as ammunition, on a movable platform such as the deck or hold of a ship. Such a portable trolley track and trolley assembly is especially valuable for breaking out ammunition in fleet supply vessels while transferring cargo under way or at sea.

Referring now to the drawings, and particularly Fig. 1 thereof, it will be seen that the invention comprises a trolley track beam or member 10 having a transverse trolley track or support flange 12 on the bottom and at the top having longitudinally spaced transverse support fittings 14. The beam 10 is an I-beam-like member having a larger top flange 16 than that (12) on the bottom. The fittings 14 may be located, as shown, on either end of the beam 10, or a plurality of like members can be provided at regular intervals along the length of beam 10 corresponding to the spacing of the hole-bearing overhead members such as those shown in copending application S.N. 457,474, now U.S. Patent No. 2,834,304.

As will be seen, the fittings 14 each comprises a box-like member formed of two parallel, transverse side plates 18 welded across the top flange 16 and a top cross plate 20 and a bottom cross plate 22 welded across each of the ends of transverse plates 18. It is also desirable to place a gusset plate 19 rearwardly on each side of each fitting 14, the gusset plate being welded to side plate 18 and to the top flange 16 of the member 10. The construction of the fitting 14 at the opposite sides of the beam 10 is the same and accordingly the right-hand end as shown in Fig. 2 will be described in detail, it being understood that the left-hand end shown in elevation in Fig. 2 is of the same construction. Bolts 24, 26 are passed through side plates 18, each of the bolts 24 serving as a pivot on which is mounted a latch lever 28, the latter having a lock-pin 30 secured thereto and projecting upwardly above plates 18, 20, an inwardly-extending handle 31, and an outwardly-extending handle portion 32 having a notch-like recess 34. Secured around the end of a bolt 36 passed up through bottom cross plate 22 is a spring 38 having its other end secured around a small stub-like anchor 40 projecting from the underside of handle 32. Pins 30 are held in proper relationship for entry into holes 39 of the overhead structure 41 by bolts 26 and the urging of springs 38. Also secured to bolt 36 is a safety lock lever 42 which has a slotted hole to permit its movement in an outward direction out of engagement with shoulder 34 of handle 32 to assume a position indicated in dotted outline. On the inner end, lever 42 has a lip 43 which engages the edge of plate 22 to lock the lever in position. Though the drawings illustrate the locking mechanism as having a single fixed pin 44 located between two lock pins 30, it is to be understood that more than one fixed pin may be arranged to cooperate with one or more lock pins.

The above-mentioned lock pins 30 cooperate with a straight-sided fixed pin 44 located centrally above the central web of beam 10, the pin 44 being secured to a rectangular shank 46 welded between side plates 18. To install the trolley support track 10, the lock levers 42 are moved outward from under shoulders 34 by pushing upward on surface 45 of the inner lip 43 of lever 42 until the lip clears cross plate 22, then pushing outward on surfaces 45 until lips 43 ride up on top of cross plates 22 and the levers 42 disengage shoulders 34. Pins 30 and 44 are then located with respect to three of the holes 39 in an overhead member 41 and then pushed in so that the shoulders 48 of pins 30 snap into engagement with the edges of their holes 39 under the urging of the springs 38. The pins 30 are free to pivot slightly about bolts 24 to make this possible. The tapered or chamfered ends of pins 30, 44 facilitate positioning and this snapping-in movement. The lock levers 42 then are pushed in to assume the locked position shown in solid outline in Fig. 2. In this position, the trolley support track member 10 is positively locked to the overhead members and cannot be accidentally disengaged. The user can readily check the position of safety lock levers 42 since they are readily visible from below. It will be noted that the springs 38 serve the double purpose of urging the lock pins 30 into the locked position and preventing the outward movement of safety lock levers 42 from under the notch-like shoulders 34 by urging the lips 43 downward behind the edges of bottom cross plates 22. If the pins 30 and lock levers 42 are gravity operated, the springs 38 would not be required.

The track member is disengaged from the overhead members by raising and pushing the lock safety levers 42 to their outer position, grasping either of handles 31, 32 on each side and pushing or pulling, respectively, to disengage the shoulders 48 from the edge of the holes and then pulling the pins 30, 44 from the holes in the overhead structural members. If the overhead is too far from the surface on which the operator stands, simple tools may be provided for raising and lowering the track and for locking and unlocking the mounting fittings.

The track member is preferably made in standard lengths which are a simple multiple of the overhead member spacing. The overall length of the trolley track installation then is easily adjusted by merely adding or subtracting one or more lengths of track.

The trolley track member 10 may be provided with any conventional trolley assembly, if desired. However, for use with a portable track, and especially for handling ammunition and other delicate or dangerous cargo, the trolley assembly shown in Figs. 3 and 4 is much preferred because it incorporates a safety stop, hereinbefore referred to as a dead man's stop. Ammunition and certain other types of delicate cargo make it imperative that a crane load of cargo not "get away" from the crane man and collide with other cargo or structural members. This can easily be brought about by a shifting, pitching or rolling of a ship at sea or by a stumble or other failure on the part of the operator himself.

As will appear in Figs. 3 and 4, there is shown a trolley assembly comprising four flanged trolley wheels 50 mounted on a frame comprising a pair of U-shaped members 52, the upper ends of which are secured to side plates 54. Across each of the members 52 there is welded a cross piece 56. Between the cross pieces 56 there is provided a longitudinal brace member 58. In each end of the U-shaped members 52 there is journalled the shaft 60 of each trolley wheel 50, the wheel being secured in place by a washer 62 and nut 64. Secured to one of the side plates 54 between the wheels 50 is an upwardly projecting, curved stop lock plate 66 having a notch-shaped opening or depression 68 to receive the end of a stop lever 70.

The stop lever 70 is supported by a bracket 72 secured to the other side plate 54 and comprising a pair of upstanding bracket plates 74 which are notched to fit over the inside edge of the side plate 54. The bracket plates 74 are braced on each side by tapered brace plates 76. A bolt 78 passed through bracket plates 74 serves to pivotally support the stop lever 70. A small bolt 80 secured across bracket plates 74 serves as the upper anchor for a small extension spring 82 which has its lower end secured in a hole 84 in an outwardly-projecting bracket arm 86 integral with stop lever 70. Also secured in hole 84 is a pull cord or chain 88 which operates the stop lever 70. A pull downwardly on chain 88 pulls stop lever 70 out of the notch 68 and out of a stop hole 90 in the beam 10. As will be seen most clearly in Fig. 1, the web portion of beam 10 is provided with regularly-spaced holes 90 to stop the trolley assembly at a great many points thereon. Should the operator intentionally or accidentally release the chain 88, the spring 82 urges the lever 70 through one of the holes 90 and into seating engagement in notch or "seat" 68. This will positively stop the trolley at any position on the beam 10 to prevent accident and also to fix the trolley in position above the cargo to be lifted.

While the "dead man" stop described above serves to stop the trolley at any desired point when the chain or pull cord 88 is released, such a stop will not prevent an absent-minded operator from maintaining tension on pull chain 88 until the trolley runs off the end of track 12. To prevent this, a simple clamp-on stop is provided which may be installed at either end of track 12, or at any intermediate point, if necessary, to positively stop the trolley. Such a device shown in Figs. 1 and 5 may comprise two pieces of metal 100, shown as round in shape and ground flat so as to fit together, a pair thereof being secured to either side of the web of the I-beam, so as to project outwardly therefrom at a position to engage the rollers 50. The stop pieces 100 each have a shoulder 101 which fits into hole 90. Bolts 102 passed through web holes 90 secure the pieces to the web. These stops may be removed if it is desired to extend the track by adding sections and they may be added anywhere on the track, as required.

It is to be understood that the track and trolley of this invention can be used in conjunction with any type of portable hoist of the manually-operated and power-operated types. Such a device is suspended from the trolley of Figs. 3 and 4 by passing a hook or other fastener through a hole 92 (Fig. 3) provided in lower longitudinal brace 58. For most uses, a block and tackle or geared block and tackle or chain hoist usually is lighter in weight and more easily attached and detached as desired.

In the freight-loading system shown in the copending application referred to above, the overhead pattern of fixed, hole-bearing structural members usually is sufficiently unencumbered that the track of this invention can be placed anywhere thereon and directly above the cargo to be lifted. The track beam 10 is easily raised and locked into position, the trolley slid into position on the track and the crane or hoist mechanism then being attached to the trolley. When it is desired to change the track location, the trolley can be removed from the track to lighten the weight to be lifted. In most cases, the holds of ships, railroad cars, etc. will have their freight or cargo stored with aisles and passageways provided therebetween. In such cases, the track will usually be placed at right angles to the passageways so as to move freight to the aisle where dollies, skid trucks, conveyors and other means are provided to move the freight out of the area. However, two tracks of this invention could be mounted at right angles with one extending down the aisle and another being used at right angles to move the freight out of the stack or tier to the aisle. As unloading progresses, the track and trolley of this invention can be periodically moved over fresh tiers or stacks of freight or to remove individual items or packages of freight from a number of tiers or stacks. Given sufficient head-room, with the portable track and trolley of this invention, individual items can be removed from the interior of large bays, racks, bulkheads and the like without removing frames, bracing members and bulkheading members. The track and trolley of this invention provides the use of a crane or hoist in places where it is ordinarily impractical or not possible to install a permanent crane of the travelling type. The inexpensive portable crane of this invention does the same work as the more expensive permanent type. Moreover, a permanently installed crane would complicate the installation of the fixed pattern of overhead structural members required in the freight-loading apparatus of the above-mentioned copending application.

What is claimed is:

1. A portable trolley track for removable attachment to a support structure having a pair of holes therein, said portable trolley track comprising an elongated structural member having a tracklike trolley supporting surface and a plurality of transverse mounting fittings located along its length, each said fitting including at least one fixed pin and at least one pivotally mounted locking pin, said pins being adapted for insertion into said holes in said support structure, means on at least one of said pins for engaging said support structure for preventing withdrawal of said pins from said holes in said support structure and including a shoulder on said locking pin adapted to be moved through a hole in which said locking pin is inserted, and means mounted on said member and yieldably urging said locking pin to a position in which it holds said shoulder in position for engagement with said support structure at an edge of said hole.

2. A portable trolley track as defined in claim 1 including mechanical means mounted on said member for positively locking said pivotally mounted locking pin in said position.

3. A portable trolley track for removable attachment to a support structure having a plurality of holes therein, said portable trolley track comprising an elongated structural element having on one side a continuous trolley track surface and near the opposite side a plurality of transversely extending mounting fittings, each said fitting including a frame member, at least one fixed straight-sided pin on said member and on either side thereof a pivotally mounted locking pin, said pins being adapted for insertion into said holes in said support structure, means on said locking pins for engaging said support structure for preventing withdrawal of said pins from said holes in said support structure and including a shoulder on each of said locking pins adapted to be moved through a hole in which said locking pin is inserted, means pivotally mounting each said locking pin for movement to and from a position in which said shoulder thereof is adapted to engage said support structure at an edge of the hole in which the locking pin is inserted, spring biasing means mounted on said member and urging each of said locking pins to its said position, and means mounted on said member including movable safety lock levers and operative to positively hold said locking pins in said positions, said last named means including lock lips engaging said member when in engaged position to hold said levers operative to fix said locking pins in said locking positions and urged into said engaged positions by said spring biasing means.

4. A track and trolley assembly for removable attachment to a support structure having a plurality of holes therein, said track and trolley assembly comprising an elongated structural member having one of its sides designed to support a trolley and having near its opposite side a plurality of transversely extending mounting fittings, each said mounting fitting including at least one fixed locating pin projecting upwardly therefrom and having on either side thereof a pivotally mounted upwardly projecting locking pin, means on each of said locking pins for engaging said support structure for preventing withdrawal of said pins from said holes in said support structure and including a shoulder on each of said locking pins adapted to be moved through a hole in which said locking pin is inserted for engaging said support structure at the edge of the hole in which said locking pin is inserted, means pivotally mounting said locking pin on said fitting for movement to and from a locking position in which said shoulder is adapted to engage said support structure at the edge of the hole in which said locking pin is inserted, spring biasing means on said fitting for urging each of said locking pins to said locking position, and mechnaical locking means on said fitting for engaging each of said locking pins to positively hold each of said locking pins in said locking position.

5. In a loading system including a support structure having a pair of holes therein, a member for removable attachment to said structure, said member including a pair of spaced locking pins adapted to project into said holes, means on said locking pins for engaging said support structure for preventing withdrawal of said pins from said holes in said support structure and including a shoulder on each of said locking pins adapted in one position of said locking pin to engage said support structure at an edge of the hole into which said locking pin projects, means for changing the spacing between said locking pins, and means on said member independent of said support structure for holding said pins in a spaced position wherein the distance between them is slightly different than the distance between said holes, said shoulders of said locking pins being disposed when said pins are in said spaced position to engage said support structure at the edges of the holes into which said pins project.

6. In a loading system, an overhead track for removable attachment to a support structure having a pair of holes therein, a support bracket secured to said track, said bracket having a pair of locking pins adapted to project into said holes in said support structure, means on said locking pins for engaging said support structure for preventing withdrawal of said pins from said holes in said support structure and including downwardly facing locking shoulders on said locking pins, a movable member on said bracket carrying one of said pins and movable to vary the distance between said shoulders, means on said bracket urging said member to a locking position in which the locking pin thereof is spaced a predetermined distance from the other of said pins and the shoulders of said locking pins are disposed to engage said support structure at the edges of said holes, and a latch member in engagement with said movable member to positively hold it in said locking position.

7. The invention set forth in claim 6 wherein said movable member is pivoted on the bracket and said latch member is shiftable thereon and has a latch shoulder engageable with a portion of said bracket to lock said latch in operative position.

8. The invention set forth in claim 6 wherein said movable member comprises a centrally pivoted lever having actuating arms on either side of said pivot.

References Cited in the file of this patent

UNITED STATES PATENTS

| | | |
|---|---|---|
| 744,464 | De Bonneville et al. | Nov. 17, 1903 |
| 885,001 | Cameron | Apr. 14, 1908 |
| 886,276 | Tolton | Apr. 28, 1908 |
| 983,262 | Beatty | Feb. 7, 1911 |
| 1,291,606 | Nelles | Jan. 14, 1919 |
| 1,346,313 | Hassler | July 13, 1920 |
| 1,389,545 | Click | Aug. 30, 1921 |
| 1,550,141 | Bennington | Aug. 18, 1925 |
| 1,566,037 | Nelles | Dec. 15, 1925 |
| 1,592,814 | Harris | July 13, 1926 |
| 1,662,539 | Schmidt | Mar. 13, 1928 |
| 1,726,993 | Macdonald | Sept. 23, 1929 |
| 1,778,332 | Meyer | Oct. 14, 1930 |
| 1,846,178 | Bergren | Feb. 23, 1932 |
| 1,852,173 | Lundborg et al. | Apr. 5, 1932 |
| 2,076,106 | Wehr | Apr. 6, 1937 |
| 2,156,827 | Wehr | May 2, 1939 |
| 2,265,385 | Martin | Dec. 9, 1941 |
| 2,331,860 | Stevens | Oct. 12, 1943 |
| 2,476,362 | Fahland | July 19, 1949 |
| 2,575,550 | Fahland | Nov. 20, 1951 |
| 2,577,789 | McCarn | Dec. 11, 1951 |
| 2,593,174 | Odell | Apr. 15, 1952 |
| 2,630,076 | Stieve | Mar. 3, 1953 |
| 2,642,814 | Anjeskey | June 23, 1953 |
| 2,761,394 | Contrell et al. | Sept. 4, 1956 |
| 2,768,588 | Robb | Oct. 30, 1956 |
| 2,834,304 | Chapman et al. | May 13, 1958 |

FOREIGN PATENTS

| | | |
|---|---|---|
| 353,971 | France | July 12, 1905 |
| 640,493 | France | Apr. 2, 1928 |
| 657,057 | France | Jan. 11, 1929 |